(No Model.)
F. A. MORSE.
AUTOMATIC LIQUID INDICATOR.
No. 559,061. Patented Apr. 28, 1896.
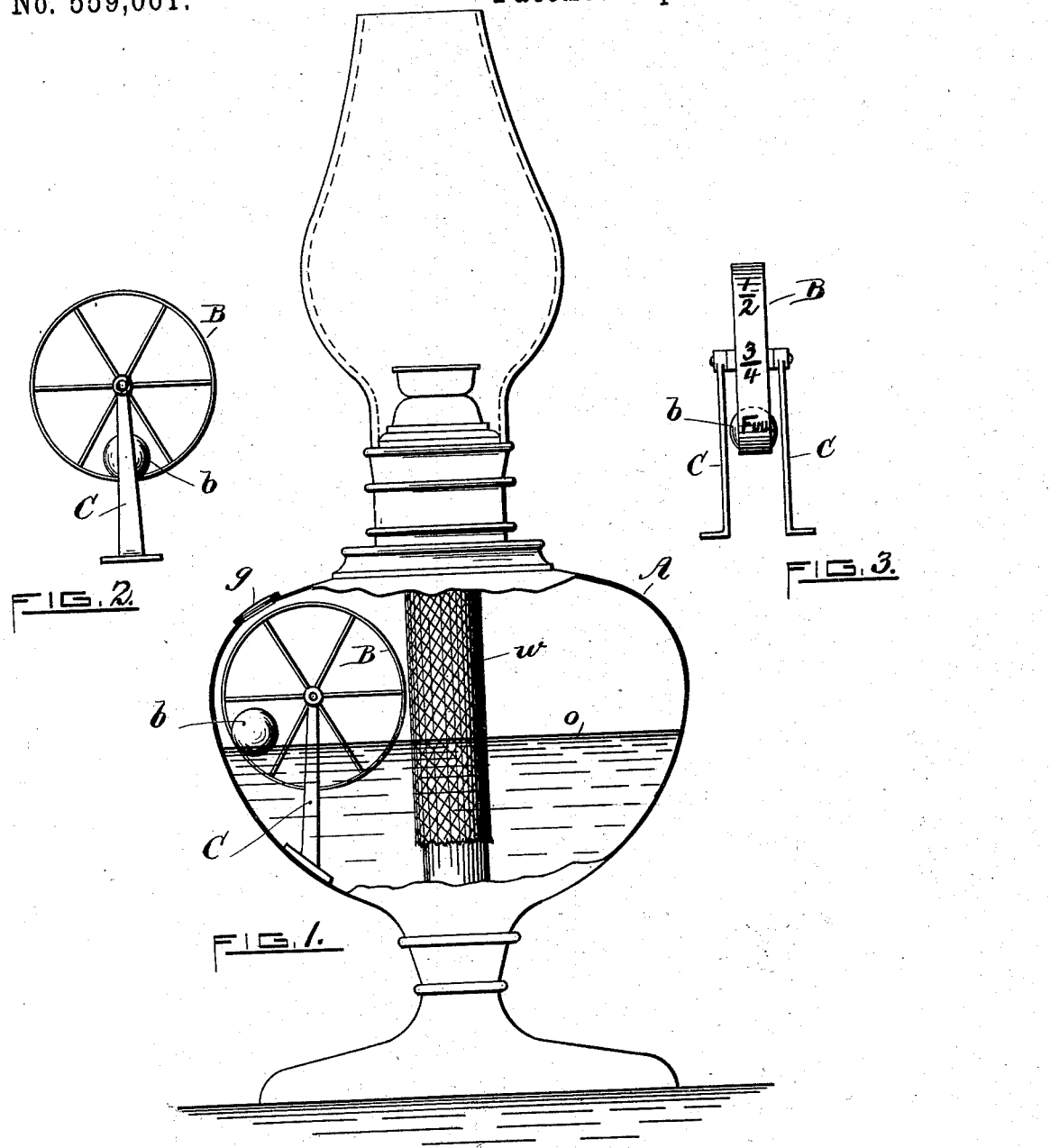
WITNESSES.
INVENTOR.
Frederic A. Morse
by James L. Jenks
Atty.

UNITED STATES PATENT OFFICE.

FREDERIC A. MORSE, OF PAWTUCKET, RHODE ISLAND.

AUTOMATIC LIQUID-INDICATOR.

SPECIFICATION forming part of Letters Patent No. 559,061, dated April 28, 1896.

Application filed January 30, 1896. Serial No. 577,379. (No model.)

*To all whom it may concern:*

Be it known that I, FREDERIC A. MORSE, a citizen of the United States, residing at Pawtucket, in the county of Providence and State of Rhode Island, have invented certain new and useful Improvements in Automatic Liquid-Indicators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in automatic liquid-indicators in which the height of liquid in a closed vessel may be ascertained by means of an opening in the vessel and a movable index actuated by the rise and fall of the liquid within, said index being visible through the opening; and the purpose of my invention is to provide a device by which the quantity of liquid contained in an opaque vessel may be determined by a simple inspection of the movable index. I attain this purpose by the device shown in the accompanying drawings, in which—

Figure 1 is the elevation of a lamp containing my invention, one side of the lamp being broken away so as to show the interior. Fig. 2 is the automatic indicator removed from the lamp, and Fig. 3 is an edge view of the wheel and standards forming the movable index.

The same letters are used to represent the same parts throughout.

My invention consists, essentially, of a wheel with a broad tire or rim, having a float attached to the rim, the whole easily revolving upon a suitable axle or bearings and visible through a lens or other transparent substance set in the side or top of the containing vessel.

The drawings show a common lamp with my indicator attached; but it can be used in any kind of vessel and for any kind of liquid equally well.

In Fig. 1, B is the wheel, set upon the standards C and having fixed to the rim the float $b$, $o$ being the surface of the oil. As the oil falls in the lamp the wheel is revolved by the weight of the float $b$, and as the oil rises while the lamp is being filled the wheel revolves in the opposite direction by the bouyancy of $b$.

$g$ is a piece of glass or other transparent substance set in the upper part of the oil-holder, and the wheel is so set as to bring its rim in close proximity to this glass, thus enabling it to be readily seen through $g$ as it revolves. This rim is suitably marked, as shown in Fig. 3, showing whether the lamp is one-half full or more or less.

Where vessels of known capacity other than lamps are supplied with my improvement, the rim may be marked with figures of capacity, such as quarts or gallons, thus showing at all times the quantity of liquid in the vessel and also serving as a means for determining how much is drawn out at any given time.

When used in a lamp, the running over of oil while filling may be easily avoided by my invention, as the exact height of the oil can be easily seen through $g$.

Having now described my invention, what I claim, and desire to secure by Letters Patent, is—

1. An automatic liquid-indicator consisting of a properly-mounted wheel having attached to its rim a float causing the wheel to revolve by the rise and fall of the surrounding liquid, the rim being marked with suitable characters, substantially as described for the purpose specified.

2. The combination in an automatic liquid-indicator of a wheel capable of revolving by the rise and fall of the surrounding liquid by means of a float attached to the rim thereof; said rim being marked with suitable characters representing quantity; with a containing-vessel having fixed in the wall thereof a transparent eyepiece in close proximity to the rim of said wheel, all substantially as set forth.

In testimony whereof I affix my signature in presence of two witnesses.

FREDERIC A. MORSE.

Witnesses:
JOHN E. LE FAVOUR,
LELLAN J. TUCK,